Oct. 4, 1938.　　　　L. BRODTON　　　　2,132,094
MULTIBAND INDICATOR
Filed June 30, 1936
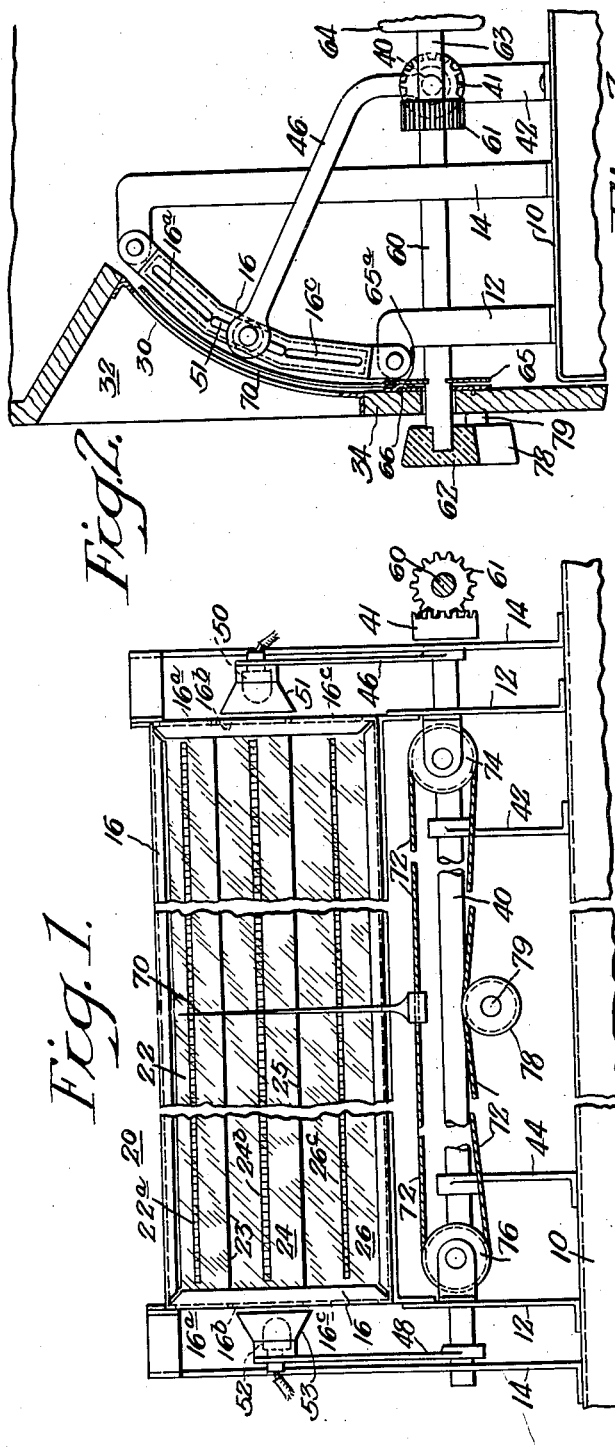
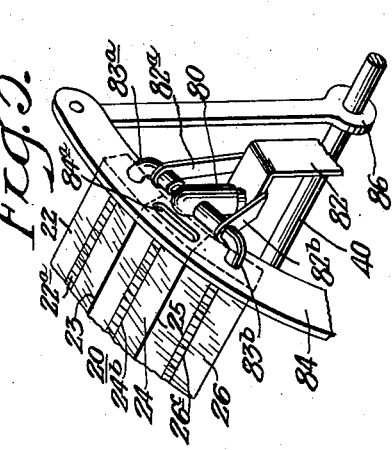
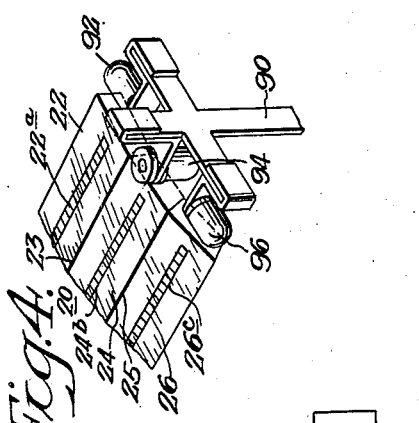
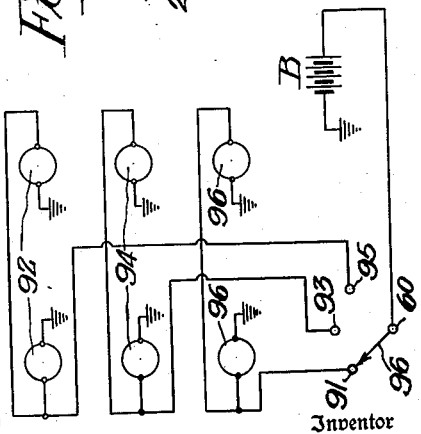
Inventor
Lynn Brodton
By J. Huff
Attorney Patented Oct. 4, 1938

2,132,094

UNITED STATES PATENT OFFICE 2,132,094

MULTIBAND INDICATOR

Lynn Brodton, Collingswood, N. J., assignor to Radio Corporation of America, a corporation of Delaware Application June 30, 1936, Serial No. 88,177

9 Claims. (Cl. 116—124.1)

This invention relates to multi-scale indicators, particularly to tuning indicators for radio apparatus and has special reference to the provision of a translucent multi-scale indicator and to means for selectively illuminating the scales.

While the invention will be described in connection with radio receiving apparatus, it is to be understood that the invention is not limited to such application as the disclosure in this respect is merely illustrative for purposes of explaining the inventive concept.

Modern radio receiving sets are usually capable of translating not only frequencies within the standard broadcast range but also frequencies within the intermediate and low frequency ranges. It is desirable, in order to avoid confusion, that there be some positive indication of the particular frequency range to which the receiver is tuned. To this end it has previously been proposed to provide several band scales on a continuous surface and to selectively illuminate only that portion of the surface containing a desired scale. Where, as is usually the case, a translucent surface illuminated from the rear is provided, difficulties arise in confining the illumination to the particular scale selected. While this may be effectively accomplished either by means of masks covering other than the selected band scale, or by means of reflectors individual to the several scales, the masks and reflectors required are cumbersome and occupy space in the cabinet which might be otherwise usefully employed.

A principal object, therefore, of the present invention is to provide a simple, compact, inexpensive and trouble-free multi-scale indicator wherein but one band-scale, indicative of the particular frequency range in use, is illuminated at any given moment.

Another object of the invention is to provide a multi-scale indicator characterized by an economy of moving parts and one which lends itself readily to mass production methods.

Another object is to provide novel means for edge-illuminating a multi-scale indicator.

The invention contemplates and its construction provides a plurality of translucent surfaces intimately joined in edge to edge relation with interposed layers of opaque material. Each segment is marked with a scale indicative of a particular frequency band and means are provided adjacent the terminal edges of these surfaces for illuminating a selected scale. The opaque layers intermediate the several discrete surfaces confine the illumination to the surface selected and prevent diffusion or divergence of the light to the other of said scale-bearing surfaces.

The translucent surfaces containing the several band scales may, in the interest of compactness, be so arranged as to constitute more than two adjacent sides of a surface of a polygon having more than four similar sides. Stated another way, they may be disposed uniformly about an arc of substantially less than 90° in planes tangent to said arc. Lamps individual to the several surfaces may be fixedly mounted adjacent each exposed edge in which case switch means preferably connected to the wave change mechanism are provided for selectively illuminating the lamps. If desired a lamp may be provided adjacent each entire edge, in which case each lamp is mounted on an arm pivoted at a point corresponding to the common axis of curvature of the scale surfaces. In another embodiment lamps common to two or more scales are fixedly mounted common to two or more scales are fixedly mounted adjacent each exposed end of the scale edges and masks are pivotally mounted to prevent light rays from impinging on the edges of the other scale elements.

Certain details of construction, together with other objects and advantages will be apparent and the invention itself will be best understood by reference to the following specification and to the accompanying drawing, wherein:

Fig. 1 is a front elevation and Fig. 2 is a side elevation of a multi-scale indicator including a pair of lamps pivotally mounted for selectively applying light to the exposed edges of the surfaces upon which the band-scales are marked.

Fig. 3 is a perspective view of a multi-scale indicator including edge illuminating means comprising a fixedly supported lamp common to the several band-scale surfaces and a pivotally mounted slotted mask therefor.

Fig. 4 is a perspective view, and Fig. 5 is an electrical diagram of edge illuminating means for a multi-scale indicator employing lamps individual to the surfaces to be selectively illuminated.

Like reference characters represent the same or corresponding parts in all figures.

In Figs. 1 and 2, 10 designates the chassis, base or panel of a radio receiver. Immovably supported above base 10 as by two pairs of oppositely located brackets 12 and 14 is a frame 16 supporting a translucent screen which is designated generally by reference numeral 20. Screen 20 is constituted by a plurality of slat-shape translucent members 22, 24 and 26 formed of glass or like material joined together along their long edges by interposed layers 23 and 25 of opaque material. The frame 16 is formed of horizontal and vertical U-shape strips which grip the edges of the translucent screen 20. The vertical sections of the frame 16 carry slots 16a, 16b, and 16c to permit the impress of light from source 50, 52 upon the edges of the discrete translucent members 22, 24 and 26.

The outer surface of each translucent member carries a preferably linear frequency band scale, designated, respectively, 22a, 24b and 26c, which may be viewed through a transparent window 30 which spans a recessed aperture 32, provided for the purpose, in the front panel 34 of the set. The number of translucent members and hence the number of separate scales corresponds to the number of frequency ranges or bands to which the radio apparatus is adapted to be tuned —in this embodiment, three. These discrete transparent scale bearing members 22, 24, 26 are so arranged, in the interest of compactness, that their outer surfaces constitute a continuous surface corresponding to a portion of a surface of a polygon. Stated another way, these discrete scale-bearing surfaces may be said to be disposed uniformly about an axis of curvature in separate planes normal to different radii thereof. If desired, however, the scale bearing surfaces 22, 24, 26, may be curved to constitute a true arc of a circle or, if space permits, they may be arranged in a single plane. In any event the terminal edges of these members preferably lie in a common vertical plane and except for the edge portions of the interposed layers 23 and 25 of opaque material, are translucent. If desired each of these translucent members may be formed of different colored glass, or the individual edges thereof may be colored to provide a distinctive indication of the particular scale in use.

A shaft 40 journaled in a pair of supports 42—44 on base 10 is positioned in the rear of and parallel to the translucent screen 20. Fixed adjacent opposite ends of shaft 40 and adapted to move therewith is a pair of lamp posts 46, 48 carrying lamps 50 and 52 enclosed in reflectors 51 and 53, respectively, whose open ends are presented to the exposed edges of the translucent screen 20. The dimensions of the open ends of these reflectors and of the slots 16a, 16b, 16c in supporting frame 16 correspond substantially to the dimensions of the individual translucent scale bearing member 22, 24 and 26 constituting screen 20, so that when the lamps 50 and 52 are in position adjacent the opposite edges of any one of them light is directed on that one only and not on the adjacent scale element. The layers of opaque material 23 and 25 interposed between screen elements 22, 24 and 24, 26, respectively, confine the light to the screen element against the edges of which the reflectors 51, 53 are directed.

The mechanism for moving the lights into position adjacent the opposite edges of the screen element which bears a particular band scale may be of any suitable or convenient type. Thus, as shown in Figs. 1 and 2, shaft 40 is provided with a cup-gear 41 adjacent one end thereof which meshes with a complementary gear 61 carried on a shaft 60, which extends through the front panel 34 of the set and is provided with a control knob 62. Knob 62 likewise controls a suitable wave change switch 64 connected to an extension 63 of shaft 60. As shown in Fig. 2 shaft 60 carries a disc 65 having a number of detents 65a therein which are adapted to be selectively engaged by a ball 66 or other protuberance fixed to the inner wall of panel 34 to lock the wave change and light-moving mechanisms in a selected position.

The pointer and pointer moving mechanism are suitable for use with linear scales and may be of a known type. As more clearly shown in Fig. 2, the frequency indicating pointer 70 is bent or curved to conform with the contour of the translucent scale bearing surface 20. This traveling pointer 70 is fixed to a taut, endless cord or chain 72 which is wrapped about the periphery of pulleys 74 and 76 and which are rotatably supported adjacent the opposite ends of the scales. The traveling pointer 70 is adapted to be moved across the dial upon movement of a central pulley knob 78 which may conveniently be mounted on the end of the shaft 79 carrying the main tuning elements of the set.

Instead of a pointer of the type described the frequency indicator may be of the shadow type wherein light is directed through a narrow slit in a mask mounted for linear movement behind the translucent scale-bearing surfaces.

In the embodiment of the invention shown in Fig. 3 a lamp 80 is supported on an immovable bracket 82 adjacent the edge of the middle one of three translucent scale-bearing sections 22, 24 and 26. An arc-shaped mask 84 containing a single slot 84a is interposed between lamp 80 and the edges of these sections. The mask 84 is supported on an arm 86 fixed for movement with shaft 40, which shaft will be understood to be connected with an actuating mechanism similar to that shown in Figs. 1 and 2. Movement of this shaft 40, arm 86 and mask 84, locates slot 84a adjacent the edge of the translucent element containing the scale indicative of the frequency band to which the set is tuned. The bracket 82 is provided with a pair of flanges 82a, 82b which support a pair of bent quartz tubes or rods 83a, 83b which extend outwardly from lamp 80 and transmit light therefrom (in a manner peculiar to quartz) to points immediately adjacent the edges of the scale bearing surfaces remote from the lamp. This arrangement permits light from lamp 80 to be projected directly (instead of at an angle) upon the edge of one or the other of the outer scales, when the slotted mask 84 is positioned to permit illumination of said one of said scales.

In the alternative embodiment of the invention illustrated by Figs. 4 and 5, a separate lamp is provided for edge-illuminating each translucent scale-bearing element. These lamps, here designated 92, 94 and 96 are mounted on oppositely located immovable supports 90 and are adapted to be selectively energized, in pairs, by means of a switch (Fig. 5) having preferably fixed contacts 91, 93, 95, and a movable contact arm 96 which may be conveniently mounted on the shaft 60 which actuates the wave-change mechanism. As in the embodiments of Figs. 1, 2 and 3, light directed upon the edge of a selected translucent scale bearing member 22, 24 or 26 is confined thereto by the opaque layers 23 and 25 therebetween.

This invention is not intended to be restricted in scope to the specific embodiments shown, but contemplates such modifications as are within the spirit of the appended claims.

What is claimed is:—

1. In a device of the class described, a plurality of translucent scale bearing members joined in edge-to-edge relation with interposed layers of opaque material therebetween, the surfaces of said members forming a continuous surface corresponding to more than two adjacent sides of a surface of a polygon having more than four similar sides, and means for mounting said continuous surface in fixed position and with said scale bearing members presented to be viewed simultaneously.

2. A multi-scale indicator, in combination, a continuous surface of substantially arcuate contour constituted by a plurality of translucent scale bearing members having interposed layers of opaque material therebetween, means for mounting said arcuate surface in a fixed position and with said scale bearing members presented to be viewed simultaneously, and means disposed adjacent an edge of said surface for selectively illuminating said scale bearing members.

3. The invention as set forth in claim 2 wherein illuminating means are disposed adjacent opposite edges of said translucent arcuate surface.

4. A multi-scale indicator comprising, in combination, a continuous surface of substantially arcuate contour constituted by a plurality of translucent scale bearing members having interposed layers of opaque material therebetween, means for mounting said arcuate surface in a fixed position and with said scale bearing members presented to be viewed simultaneously, illuminating means disposed adjacent an edge of said surface, and means requiring relative movement between said illuminating means and said surface for selectively illuminating said translucent scale bearing members.

5. A multi-scale indicator comprising, in combination, a continuous surface constituted by a plurality of translucent scale bearing members having interposed layers of opaque material therebetween, illuminating means disposed adjacent an edge of said surface and means for moving said light along said edge to selectively illuminate said translucent scale bearing members.

6. A multi-scale indicator comprising, in combination, a continuous surface of substantially arcuate contour constituted by a plurality of translucent scale-bearing members having interposed layers of opaque material therebetween, a slotted mask movably mounted adjacent an edge of said surface, illuminating means fixedly mounted on the side of said mask remote from said edge, and means for moving said mask to bring the slot therein adjacent one of said translucent scale bearing members whereby to selectively edge-illuminate the same.

7. A multi-scale indicator comprising, in combination, a continuous surface of substantially arcuate contour constituted by a plurality of translucent scale bearing members having interposed layers of opaque material therebetween, means for mounting said arcuate surface in a fixed position and with said scale bearing members presented to be viewed simultaneously, a lamp disposed adjacent an edge of each of said scale bearing members, and means for selectively energizing said lamps to selectively illuminate said translucent scale bearing members.

8. A multi-scale indicator, comprising a substantially arc-like surface constituted by a plurality of slat-like translucent scale-bearing members joined along their long edges by interposed layers of opaque material, a shaft extending parallel to said arc-like surface along the radial center thereof, a lamp-post on said shaft and fixed for movement therewith, a lamp on said post positioned adjacent an exposed edge of said surface, and means for moving said shaft to bring said lamp adjacent the edge of a selected one of said translucent scale bearing members whereby to illuminate the same.

9. A multi-scale indicator, comprising a substantially arc-like surface constituted by a plurality of slat-like translucent scale-bearing members joined along their long edges by interposed layers of opaque material, illuminating means disposed adjacent a free edge of said arc-like surface, a shaft extending parallel to said surface along the radial center thereof, a post on said shaft extending normal thereto and fixed for movement therewith, a slotted mask on said post and positioned between said illuminating means and said free edge of said surface, and means for moving said shaft to bring said slot adjacent the edge of one of said translucent scale bearing members whereby to permit light from said illuminating means to impinge against the edge of a selected one of said members whereby to illuminate said selected member.

LYNN BRODTON.